Oct. 13, 1936.     W. MARCUSSEN     2,057,198
MINIATURE CAMERA
Filed May 25, 1934     2 Sheets-Sheet 1
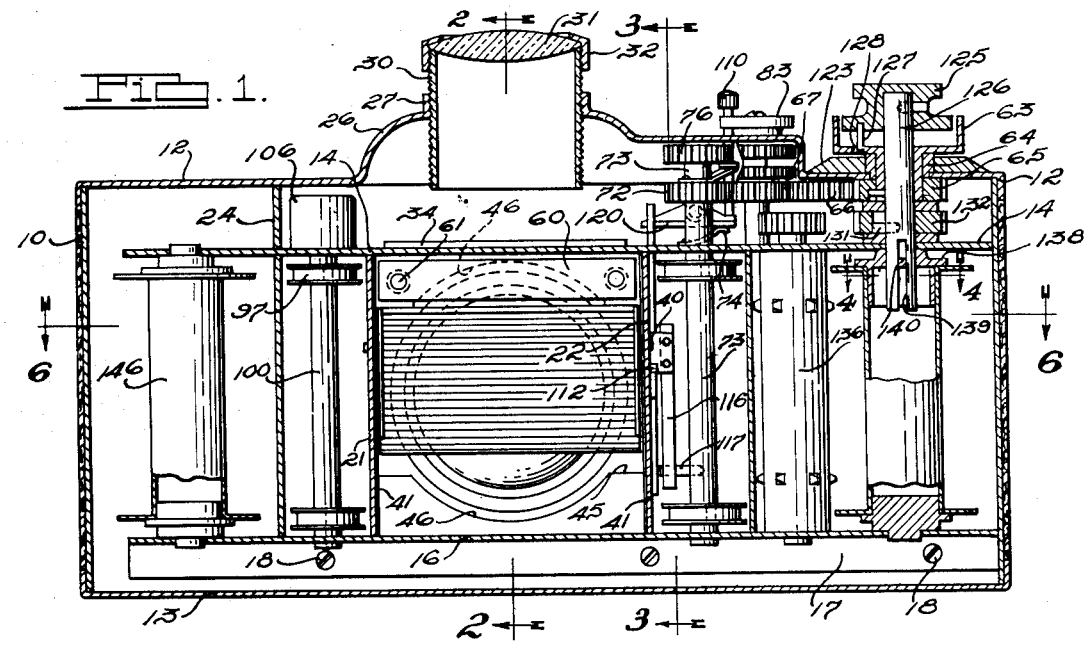
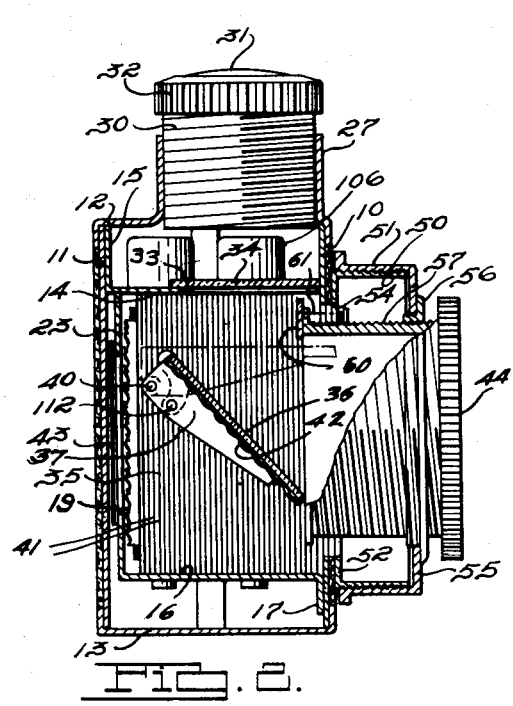
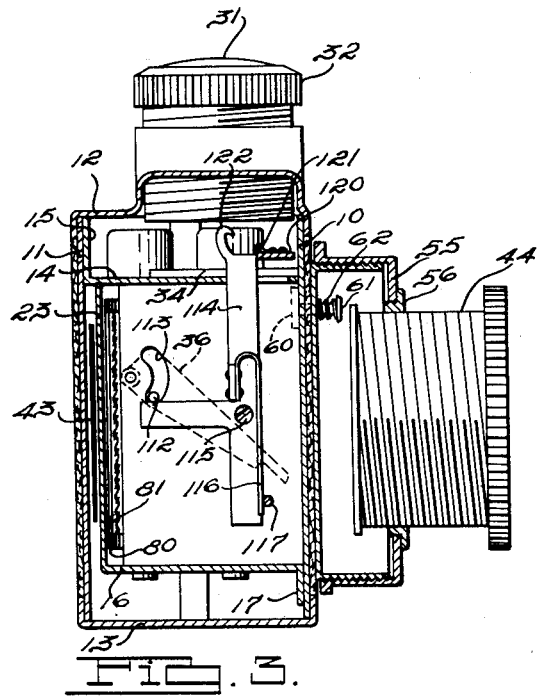
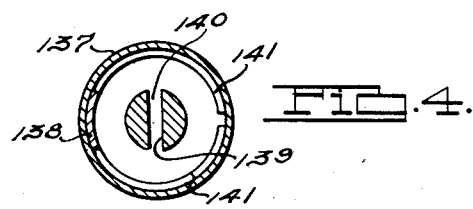
INVENTOR
Wilhelm Marcussen
BY
Harness, Dickey, Pierce & Hann.
ATTORNEYS.

Oct. 13, 1936.  W. MARCUSSEN  2,057,198
MINIATURE CAMERA
Filed May 25, 1934　　2 Sheets-Sheet 2
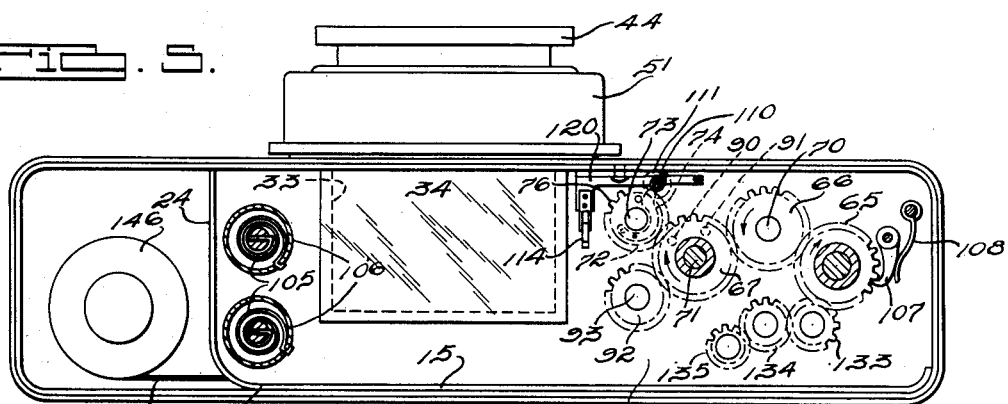
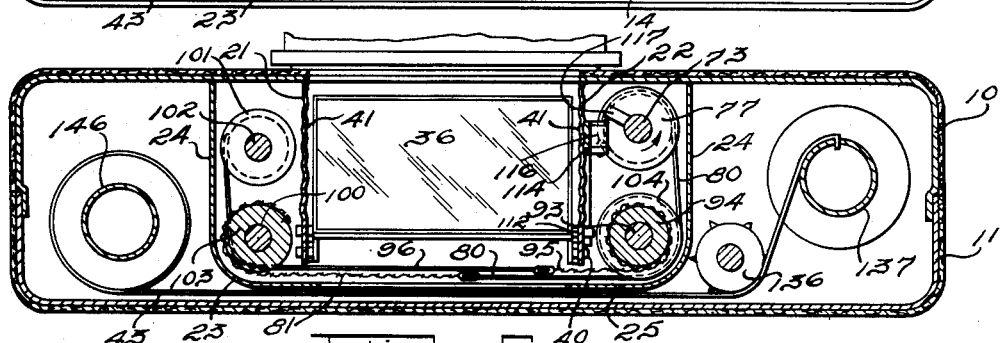
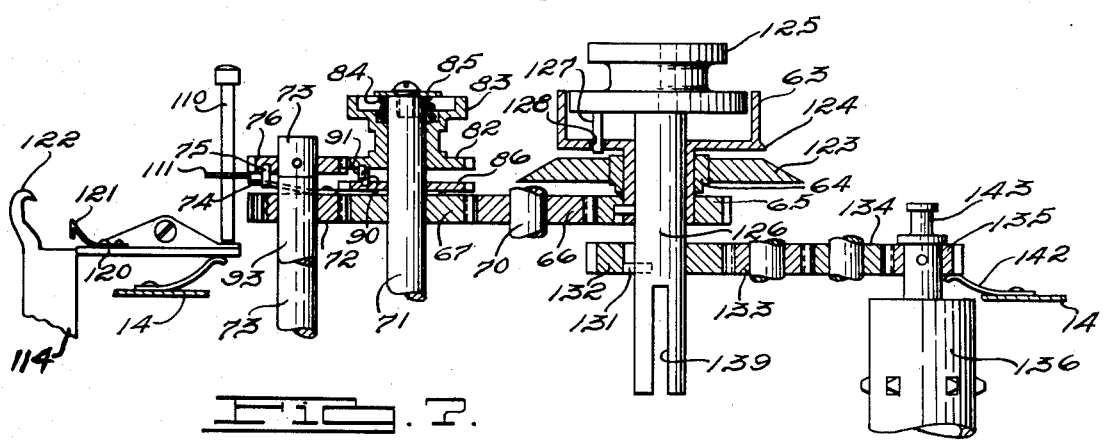
INVENTOR
Wilhelm Marcussen
BY
Harness, Dickey, Pierce & Hann.
ATTORNEYS.

Patented Oct. 13, 1936

2,057,198

UNITED STATES PATENT OFFICE 2,057,198

MINIATURE CAMERA

Wilhelm Marcussen, Hazel Park, Mich.

Application May 25, 1934, Serial No. 727,522

7 Claims. (Cl. 95—42)

This invention relates to cameras and more especially to the type of cameras employing a swinging mirror for reflecting an image upon a focusing screen.

The principal object of the invention is to improve the art of photography.

A more specific object is to provide, in conjunction with a swinging mirror and as a part of a camera, an improved focusing means adapted: to employ different focal lengthed lenses, to be at least partially retractible within the camera, and to avoid interference with said swinging mirror.

Another object of the invention is to provide in a camera construction, a camera chamber and mirror, each constructed and arranged so as to prevent reflected light from reaching a film during exposure of the latter.

A further object is to provide synchronized mechanism for adjusting the position of a film, winding up a focal plane shutter, operating a swinging mirror, and actuating an exposure counting device.

A further object is to provide means, at least partially retractible within a camera and adjustable to different eyes, for magnifying an image on a focusing screen and arranged so as to present to the view of an observer the entire image on said screen.

Other objects, features and advantages will become apparent from the following description and appended claims.

For the purpose of illustrating the genus of the invention, a typical concrete embodiment of camera construction is shown in the accompanying drawings, in which:

Figure 1 is a central, vertical section taken longitudinally of the camera construction;

Figs. 2 and 3 are vertical sections taken on the lines 2—2 of Fig. 1;

Fig. 4 is a horizontal detail section taken on the line 4—4 of Fig. 1;

Fig. 5 is a top plan of the camera construction with the top cover removed;

Fig. 6 is a horizontal section taken on the line 6—6 of Fig. 1; and

Fig. 7 is a more or less diagrammatic view of the gearing and associated parts shown in Figs. 1 and 5, certain parts being shown in section and certain gears as having their axes arranged in a single plane.

Referring to the drawings, and more especially to Figs. 1, 2, 3, 5 and 6, the camera construction includes a case having front and rear casing halves 10 and 11, a top cover 12, and a bottom cover 13. The camera is provided with an inner frame work including a top horizontal partition member 14 extending from the front casing half 10 to the rear casing half 11 and provided with a flange 15 adapted to abut the latter casing half, a lower horizontally disposed partition member 16 provided with a flange 17 at the forward edge thereof and attached to the forward casing half 10 by means of screws 18. A pair of vertically disposed partition members 21 and 22 connect the upper and lower partitions 14 and 16 and are arranged substantially normal to the front face of the camera. A vertically disposed partition member 23 completes the inner framing and has portions 24 parallel with the partition members 21 and 22 and a rear portion 25 parallel with the back face of the camera. The partition member 23 also connects the upper and lower partition members 14 and 16 and is provided in portion 25 with a film exposing window 19.

The top cover 12 is provided with an outwardly pressed portion 26 having an internally threaded flange portion 27 which threadably receives an eye piece sleeve 30. The lens 31 is held to the eye piece sleeve 30 by means of a collar 32 threaded to the sleeve 30. The upper horizontally disposed partition 14 of the inner framework is provided with a rectangular shaped opening 33 extending generally transverse of the case and covered by a ground glass screen 34 as indicated in Figs. 2 and 5. The window 33 and screen 34 are disposed directly below the lens 31. The space between the vertically disposed partition members 21 and 22 and the portions of the horizontally arranged upper and lower partition members 14 and 16 arranged between the partition members 21 and 22, constitutes the picture chamber 35 of the camera. Mounted between the vertically disposed partition member 21 and 22 is a swinging mirror 36 adapted to be moved to and from a horizontally disposed position, as indicated by dot-and-dash line in Fig. 2, to a 45 degree position, as indicated in dotted line in Fig. 3 and to a greater angular position with respect to the horizontal, as indicated in full line in Fig. 2. The mirror 36 is provided with depending flanges 37 at the lateral margins thereof, which are pivotally connected by pins 40 to the vertically disposed partition members 21 and 22, approximately below but vertically spaced from the rear edge of the mirror when the latter is disposed in horizontal position, as indicated by dot-and-dash line in Fig. 2. By arranging the pins 40 outside the plane of the mirror 36, the rear edge of the mirror moves upwardly and rearwardly with reference to the front face of the camera. This causes the front edge of the mirror to swing in an arc about the pins 40 as a center, so that the front edge of the mirror moves in a nearer vertical path than would be the case if the pivot pins 40 were disposed in the plane of the mirror 36. The inner walls of the partition members 21 and 22, which constitute the side walls of the picture chamber 35, are provided with vertically extending corrugations 41 and the bottom surface of the mirror 36, or backing therefor, is provided with laterally extending corrugations for the purpose of preventing reflected light from striking a film 43 arranged at the rear portion of the picture chamber 35. The mirror 36 is normally disposed at the 45 degree position indicated in Fig. 3 so that it will reflect an image through the front face of the camera to the screen 34 so that it may be viewed through the lens 31. The mirror 36, as previously indicated, is pivoted outside and below its own plane so that upon its upward swing it will also move in a rearward direction as much as possible to conserve space and is yieldably mounted in such a manner that it will swing to a greater angular position than the one indicated in Fig. 3 to enable a retractible lens mount 44 to be retracted into the picture chamber 35.

The front casing half 10 is provided with a rectangular and transversely arranged aperture 45 for permitting the backward swing of the mirror 36 thereto and the upper and lower margins of the aperture 45 are cut away on circular arcs as indicated at 46 in Fig. 1 to permit retraction of the lens mount 44 to a position at least partially within the picture chamber 35. Any desired type of simple or compound lens, telescopes, or the like may be mounted within the lens mount 44. The focusing device of the lens carried by the mount 44 is preferably in the form of a pair of rings 50 and 51 threaded to each other and the rings 50 provided with a flange 52 secured to the front casing half 10 and provided with an aperture 54 corresponding to the apertures 45, 46 in the casing half 10. The ring 51 is provided with an inwardly directed flange 55 at its outer end which is internally threaded for the reception of a holding ring 56 which is internally threaded to cooperate with mating threads 57 provided at the lens mount 44 for permitting further adjustment of lens held in said mount. The ring 56 may be unscrewed from the flange 55 so that any one of a number of interchangeable lens units may be mounted on the camera. The mask or blind 60 is mounted upon the rear face of the front casing half 10 by means of a pair of headed pins 61 having springs 62 thereon interposed between the front face of the camera and the heads of pins 61. The mask or blind 60 serves to cover the upper cut-away portion 46 so that light will not leak therethrough upon exposure of the film 43. The springs 62 yield to permit retraction of the blind 60 when the lens mount 44 is turned back or retracted into the picture chamber 35, as indicated in Fig. 2.

Reference may now be had to Figs. 1, 5, 6 and 7 which illustrate the mechanism for synchronizing the motion or operations of the film, the focal plane shutter, the mirror, and an exposure counting device. A shutter winding button 63 is journaled in a bushing 64 fixed to the top cover 12 and has fixed to the lower end thereof a gear 65. The gear 65 is connected by means of idler gears 66 and 67, journaled upon stub shafts 70 and 71, with a gear 72 which is journaled for free rotation upon the shaft 73. A spring 74 is secured to the upper face of the gear 72 and is deflected upwardly so as normally to engage a pin 75 depending downwardly from the lower face of a gear 76 secured to the shaft 73. As indicated in Figs. 1 and 6, the shaft 73 has secured thereto upper and lower reels 77 for carrying the bands 80 of the leading blind 81 of a focal plane shutter. The gear 76 meshes with a gear 82 formed on a slot setting button 83 for the focal plane shutter. The slot setting button 83 is journaled for rotation upon the stub shaft 71 and is reciprocable upon the shaft in an outward direction against the tension of a spring 84 interposed between a washer 85 secured to the end of the shaft and the bottom of a recess formed in the upper end of the slot setting button. A gear 86 is also journaled for rotation on the stub shaft 71 below the gear 82 and slot setting pins 90 and 91 are adapted to engage one another when the following and leading blinds of the focal plane shutter are in closed position. The pins 90 and 91 project in opposite directions from opposed faces of the gears 82 and 86. When it is desired to set the slot adjusting pins 90 and 91, the slot setting button 83 is pulled outwardly against the tension of the spring 84 until the gear 82 is brought out of mesh with the gear 76 and then the button 83 is rotated to separate the pins 90 and 91 a sufficient amount to obtain the desired slot opening between the leading and following blinds of the focal plane shutter mechanism. Gear 86 meshes with a gear 92 fixed to a shaft 93 which carries secured thereto a drum 94 upon which the following blind 95 is wound. The bands 96 of the following blind extend partially around idler drums 97 journaled for rotation upon a shaft 100 and extend and are fixed to reel 101 fixed to a shaft 102, arranged as indicated in Figs 1, 5 and 6. The shaft 100 has fixed thereto the drum 103 to which one end of the leading blind 81 is fixed. The bands 80 of the leading blind 81 extend partially around idler pulleys 104 journaled for rotation on the shaft 93. Manual rotation of the button 63 and gear 65 in a clockwise direction, as viewed in Fig. 5, will cause counterclockwise rotation of the gears 72 and 92 so as to wind up the focal plane shutter moving the blinds 81 and 95 from left to right, as viewed in Fig. 6. The focal plane shutter may be released by depressing the upwardly inclined portion of the spring 74 so as to disengage the same from the pin 75 carried by gear 76 to break the connection between gears 72 and 76.

The focal plane shutter is moved from right to left, as viewed in Fig. 6, by springs 105 each fixed at one end to one of the shafts 100 and 102 and at its other end to a cap member 106 fixed to the upper horizontal partition of the inner framing of the camera. The springs 105 are so arranged that they are wound up as the blinds 81 and 95 of the focal plane shutter are wound by rotation of the button 63 and the gear 65. A pawl 107 and spring means 108, supported by the top cover 12 prevents counter-clockwise rotation of button 63 and gear 65, (Fig. 5), of the shutter winding mechanism. The upwardly deflected portion of the spring 74 may be pressed downwardly by means of an operating or release button 110 provided with a collar 111 engageable with the upper surface of the free end of spring 74 so as to disengage the latter from the pin 75. This permits the springs 105 to operate the leading and following blinds 81 and 95 of the focal plane shutter from right to left, as viewed in Fig. 6, the proper slot opening being maintained between the blinds due to the setting of the slot control button 83 and pins 90 and 91 so that the proper slot opening will be maintained during operation of the focal plane shutter and then closed as the shutter arrives at its left-hand position. This brings the slot setting pins 90 and 91 again into engagement. The slot setting mechanism may be of any conventional type. The slot setting mechanism above is described merely by way of example.

The mirror 36 may be operated to horizontal position by means of pin 112 extending outwardly from one of the side flanges 37 and projected through a suitable arcuate slot 113 provided in the vertically disposed partition member 22. A T-shaped operating lever 114 is pivoted as indicated at 115 in Fig. 3 to the partition 22 and has a spring 116 fixed thereto. A pin 117 projecting radially outwardly from the shaft 73 is engageable with the spring 116 to deflect the spring and pin to cause clockwise rotation of the lever 114, as viewed in Fig. 3, when the spring 74 is disengaged from the pin 75 upon depression of the operating or release button 110. Clockwise rotation of the lever 114 is prevented because of engagement of the upper end thereof with a lever 120 until such time as the lever 120 has been rotated about its pivot 121 by means of the operating button 110 which engages the right hand end of lever 120. Depression of the operating or release button 110 will elevate the left-hand end of the lever 120 (Fig. 7), and permit clockwise rotation of the lever 114 so as to rotate the mirror 36 to a horizontal position by virtue of the engagement of one arm of the lever 114 with the pin 112 causing the latter to be elevated to a position adjacent the upper end of the slot 113. A spring 121 may be provided on the left hand end of the lever 120, as viewed in Fig. 7, and engageable with a catch 122 provided at the upper left hand corner of the upwardly extending arm of lever 114 so as to latch the lever in its rotated position in a clockwise direction and maintain the mirror in elevated position as long as the release or operating button 110 is depressed for the purpose of making time exposures. A counting dial 123 is mounted upon the periphery of the bushing 64 and is not rotated with respect to the latter except for resetting the dial to zero. A pointer 124 is provided on the shutter winding button 63 for counting the number of exposures made. The ratio of the number of teeth on the gears 65 and 72 is such that the gear 65 and button 63 do not rotate a complete revolution for each shutter winding. For example, the counting dial 123 may be provided with forty divisions about its circumference and the gear 65 provided with 40 teeth while the gear 72 has but 39 teeth so that the pointer 124 will drop one graduation for each shutter winding. A film winding button 125 is secured to a shaft 126 which passes through the bore of the shutter winding button 63 and through the upper horizontally disposed partition 114 for the purpose of operating the film 43. A pin 127 and a slot 128 may be provided on the buttons 125 and 63 for engaging and disengaging the same upon raising or lowering the button 125. A gear 132 is reciprocably mounted upon the shaft 126 and secured against relative rotation thereto by means of a slot and pin connection 131. The gear 132 is connected by means of gears 133 and 134 to a gear 135 attached to the upper end of the shaft of a tooth drum 136 which serves to feed a perforated film onto a film spool 137. The shaft 126 is not connected directly to the film spool 137 but rather is connected to a clutch 138 by means of a slot 139 formed in the shaft 126 and a bar portion 140 in the upper end of the clutch member 138. The lower end of the clutch member 138 is in the form of a split sleeve disposed within the upper end of the bore of the spool 137 and having spring arms 141 cut away from the upper end portion of the clutch member 138 about a substantial portion of the sleeve so that the spring arms 141 will yieldably engage the upper end of the spool 137 for rotating the same. As film is wound upon the spool 137 and the diameter of the wound spool increased upon the spool, the clutch 138 will slip within the spool so as to compensate for the increased thickness of film wound upon the spool. The gear 135 is normally maintained in mesh with the gear 134 so as to be driven by means of the gear 132 through the gear 133. A spring 142 maintains the gear 135 in elevated position so as to mesh with the gear 134. A button 143 is provided on the upper face of the gear 135 and may be depressed for disengaging the drum 136 from the gear train 132, 133, 134, so that film 43 may be rewound upon its supply spool 146 disposed at the opposite side of the camera.

As many changes may be made in the above construction, and many apparently widely different embodiments of this invention may be had without departing from the scope thereof, it is intended that all matter contained in the above description or shown in the accompanying drawings shall be interpreted as illustrative and not in a limiting sense.

What is claimed is:

1. In a camera, a case providing an exposure chamber, a swingable mirror in said chamber, means for swinging said mirror to a horizontal position so that the back of the mirror defines a top wall of said chamber, the front face of said case being provided with an opening for admitting light to said chamber, a film exposing window in said chamber opposite said opening, and means including horizontally disposed corrugations on the back of said mirror and arranged parallel to the front face of said case for preventing light admitted through said opening from being reflected by said mirror to said window.

2. In a reflex camera, a case providing an exposure chamber therein, a detachable top cover for said case and provided with an opening therein, a horizontally disposed partition in said case and arranged adjacent the top of said chamber, said partition being provided with a non-circular opening directly below the opening in said top cover, a focusing screen covering the opening in said partition, a mirror arranged in said exposure chamber below said focusing screen and normally disposed in a plane at a 45 degree angle with respect to the plane of said screen, a magnifying lens disposed directly above the opening in said top cover, means for adjusting the distance from said lens to said focusing screen, and means for moving said mirror into a plane parallel to the plane of said focusing screen to shut off light through said screen to said exposure chamber.

3. In a reflex camera, a case providing an exposure chamber therein, a removable top cover for said case and provided with an opening therein, a focusing screen disposed adjacent the top of said chamber and directly below said opening, a mirror arranged in said exposure chamber directly below said focusing screen and normally disposed in a plane at a 45 degree angle with respect to the plane of said screen, a lens and lens mounting arranged in said opening, means for adjusting the distance between said lens and screen, and means for moving said mirror into a plane parallel to the plane of said screen and directly therebelow to shut off light through the screen to said exposure chamber.

4. In a reflex camera, a case providing an exposure chamber therein, a swingable mirror pivotally mounted in said chamber and normally arranged in a 45 degree angular position with respect to the plane of the front face of said case, said case being provided with openings in both the front face and top thereof for admitting light to said chamber, a lens and lens mounting arranged in each of said openings, means for adjusting each of said lenses with reference to said mirror, a focusing screen arranged adjacent the top of said exposure chamber and below the opening in the top of said case, said screen being arranged in a plane normal to the plane of the front face of said camera, and means for swinging said mirror to a position below and parallel to said focusing screen.

5. In a reflex camera, a focal plane shutter, a swingable mirror normally positioned in a plane at an angle of 45 degrees with respect to the plane of said focal plane shutter, spring means for operating said shutter in one direction, means including a spool and a shutter winding button for winding up said shutter against the tension of said spring means, spring means for swinging said mirror to a position such that its plane is normal to the plane of said focal plane shutter, manually operable means for releasing both of said spring means for effecting operation of both the mirror and the focal plane shutter, film winding means including a film spool and a film winding button, a shaft attached to said film winding button and extending axially through the shutter winding button so as to engage said film winding spool for operating the latter, and means for detachably connecting said button for selectively effecting joint and independent operations of said shutter and film winding means.

6. In a reflex camera, a focal plane shutter, a swingable mirror normally positioned in a plane at an angle of 45 degrees with respect to the plane of said focal plane shutter, spring means for operating said shutter in one direction, means including a spool and a shutter winding button for winding up said shutter against the tension of said spring means, spring means for swinging said mirror to a position such that its plane is normal to the plane of said focal plane shutter, manually operable means for releasing both said spring means for effecting operation of both the mirror and the focal plane shutter, film winding means including a film spool and a film winding button, a shaft attached to said film winding button and extending axially through the shutter winding button so as to engage said film winding spool for operating the latter, means for detachably connecting said buttons together for effecting joint operation of said shutter and film winding means, and a slip clutch means carried by said film winding spool for compensating for unequal amounts of film wound on the film winding spool.

7. In a reflex camera, a focal plane shutter, a swingable mirror normally positioned in a plane at an angle of 45 degrees with respect to the plane of said focal plane shutter, spring means for operating said shutter in one direction, spring means for swinging said mirror to a position such that its plane is normal to the plane of said focal plane shutter, manually operable means for releasing both of said spring means for effecting operation of both the mirror and the focal plane shutter, film winding means for advancing a film, and means operable by said film winding means for conditioning said first-named spring means for operating said shutter, and said second-named spring means for operating said swingable mirror upon operation of said manually operable release means.

WILHELM MARCUSSEN.